(No Model.)
E. H. PHIPPS.
CONDUIT FOR ELECTRIC WIRES OR CABLES.
No. 395,584. Patented Jan. 1, 1889.
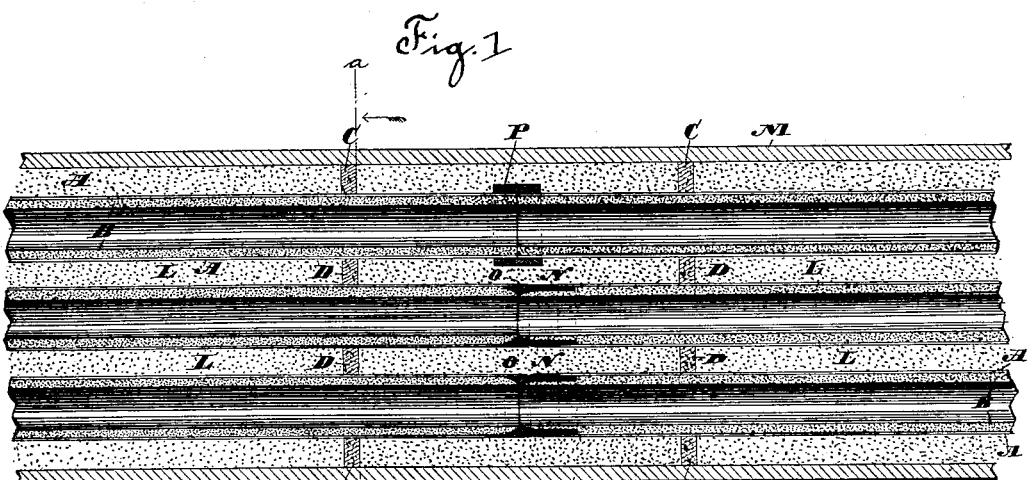
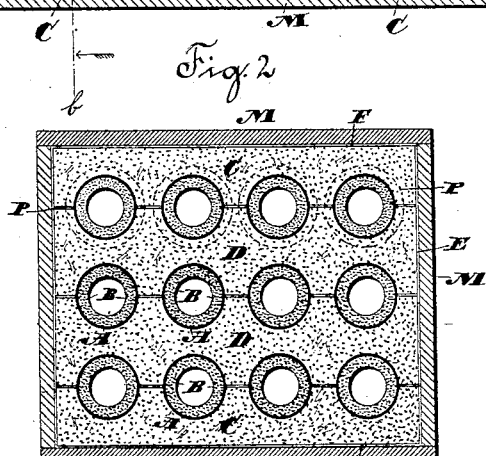
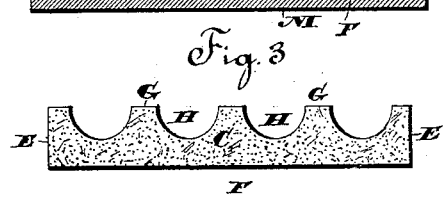
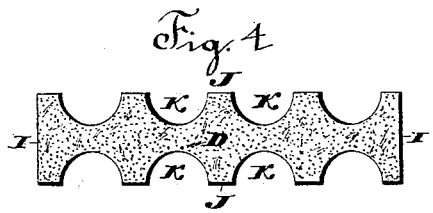
Witnesses:
Chas. B. Shumway
Chas. L. Swan Jr.
Inventor.
Edward H. Phipps.
By Geo. D. Seymour
Atty.

United States Patent Office.

EDWARD H. PHIPPS, OF NEW HAVEN, CONNECTICUT, ASSIGNOR TO EDWARD S. PEROT AND JAMES P. McQUAIDE.

CONDUIT FOR ELECTRIC WIRES OR CABLES.

SPECIFICATION forming part of Letters Patent No. 395,584, dated January 1, 1889.

Application filed July 26, 1887. Serial No. 245,325. (No model.)

*To all whom it may concern:*

Be it known that I, EDWARD H. PHIPPS, residing at New Haven, in the county of New Haven and State of Connecticut, have invented certain new and useful Improvements in Conduits for Electric Wires or Cables; and I do declare the following to be a full, clear, and exact description of the same, reference being had to the accompanying drawings, which form a part of this specification.

My invention relates to an improvement in underground conduits for electric wires or cables, the object being to produce such a conduit which shall be cheap, permanent, and dry.
With these ends in view my invention consists in a conduit for electric wires or cables composed of a sheet-metal tube or shell and a lining of cement therefor.

My invention further consists in a multiple conduit composed of two or more cement-lined metallic pipes, bridges or supports supporting such pipes in isolation and extending transversely across the line of the conduit-fabric and a filling filled in between the pipes.
My invention further consists in certain details of construction and combinations of parts, as will be hereinafter described, and pointed out in the claims.

In the accompanying drawings, Figure 1 is a view in longitudinal section of one form which a conduit embodying my invention may assume. Fig. 2 is a view thereof in transverse section on the line *a b* of Fig. 1, and looking in the direction of the arrows. Fig. 3 is a detached view of one of the outer bridges, and Fig. 4 is a similar view of one of the inner bridges.

The conduits or pipes through which the electric wires or cables are passed are each composed of a sheet-metal tube or shell, A, having a lining, B, of cement—that is, a material which not only serves as insulation for the electric wires, but which hardens under water and takes a permanent and rigid form.
As herein shown, pipes so constructed are supported near their ends in outer bridges, C, and inner bridges, D, made of cement or other composition, or of wood. The bridges C, which support and cap the pipes, have straight or square ends E, one straight edge, F, and one edge, G, provided with semicircular depressions H, adapted to receive the pipes. The bridges D, which are placed between the pipes, are provided with straight or square ends I, and have each edge J provided with semicircular depressions K, receiving the pipes. These bridges so fit together and around the pipes as to form a perfect partition transverse to the line of the conduits, such partitions being located at about pipe-lengths along the line. A filling, L, of cement or sand, or both, or of other material or composition, is filled in between and isolates and protects the pipes and forms joints between them, while the partitions isolate, as it were, the blocks of filling, which are poured in between them in the form of grout. The ends E and edges F of the bridge C and the ends I of the bridge D together give a rectangular outline to the partitions. Preferably, and as herein shown, the pipes, bridges, and filling are inclosed in a rectangular casing, M, which protects the whole fabric and forms in its bottom portion a guide for laying in truth the lower bridges, which determine the line or integrity of the whole fabric.

Any efficient joint may be employed for the pipes. As herein shown, the pipes of the two lower lines are provided with shouldered concave and convex rings N and O. These rings are made, by preference, as iron castings, male and female, and loosely fitted one into the other, so as to admit of the inevitable creeping of such structures. This simple construction makes an excellent expansion-joint. The pipes of the upper line are simply abutted and inclosed at the joint by a sleeve, P, which is packed with cement.

Conduits made in accordance with my invention are cheap to construct and are practically permanent when once laid. They preserve the wires or cables free from moisture and reduce electrical disturbance between the wires or cables of the respective pipes.

If desired, the casing may be dispensed with. If desired, also, the bridges may be arranged out of alignment, so as to secure a more even distribution of strain upon the pipes. I would therefore have it understood that I do not limit myself to the exact construction and combinations of parts herein described, and pointed out in the claims, but hold myself at liberty to make such changes and alterations as fairly fall within the spirit and scope of my invention.

I am aware that it is old to use cast-iron pipes lined with insulating compositions of various kinds, and I make no claim broad enough to include such construction. My invention consists, essentially, in this regard of a sheet-metal tube or pipe lined with hydraulic or like cement, which is not only an electric insulator, but which also hardens under water, takes a permanent form, and is practically indestructible in use. With a lining of this sort it is practicable to avoid the use of cast-iron pipes, which are heavy, unwieldy, and expensive. The sheet-metal tube is sufficiently rigid and durable to give form to the conduit, and the permanent and rigid lining of cement gives additional stability and durability. Such conduits can be aggregated into a multiple system with great ease, in small space, and with good permanent results.

Having fully described my invention, what I claim as new, and desire to secure by Letters Patent, is—

1. A conduit for electric conductors, consisting of a sheet-metal shell or tube provided with a lining of hydraulic cement, substantially as described.

2. A multiple-system conduit for electrical conductors, consisting of a suitable number of sheet-metal pipes lined with hydraulic cement, isolating-supports therefor, intervening filling of cementitious or like matter, and an inclosing-casing, substantially as described.

In testimony whereof I have signed this specification in the presence of two subscribing witnesses.

EDWARD H. PHIPPS.

Witnesses:
   CHAS. B. SHUMWAY,
   EDWARD H. RUGUR.